Oct. 3, 1944.  R. A. KUEBLER  2,359,483
VITREOUS ELECTRICAL DEVICE AND ITS FABRICATION
Filed Oct. 17, 1942  2 Sheets-Sheet 1
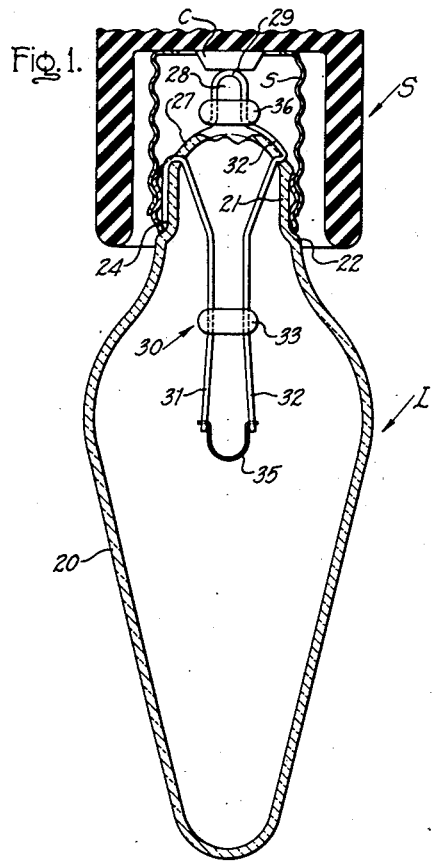
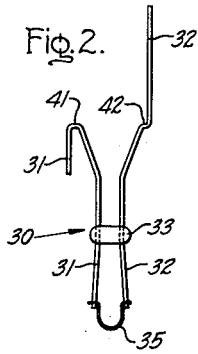
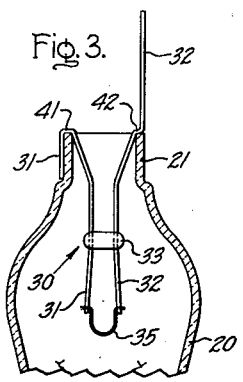
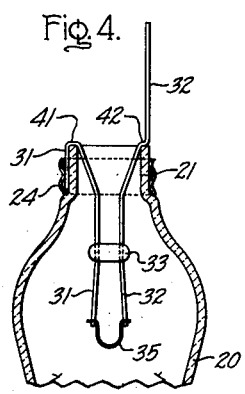
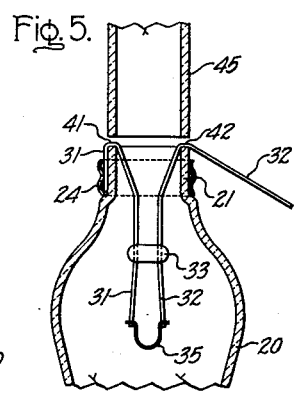
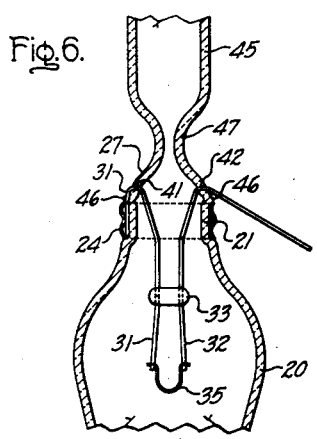
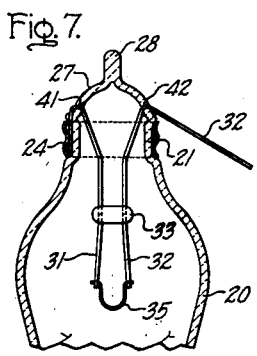
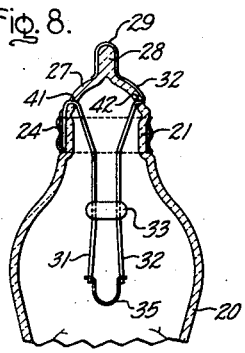
Inventor:
Robert A. Kuebler,
by John H. Anderson
His Attorney.

Oct. 3, 1944.  R. A. KUEBLER  2,359,483
VITREOUS ELECTRICAL DEVICE AND ITS FABRICATION
Filed Oct. 17, 1942  2 Sheets-Sheet 2
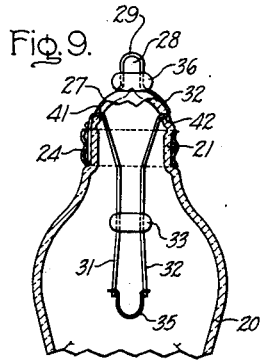
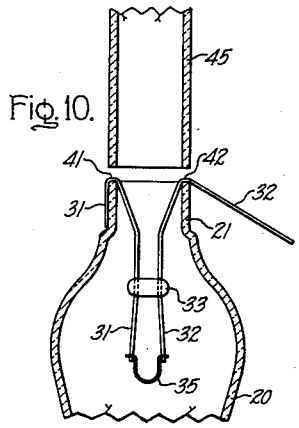
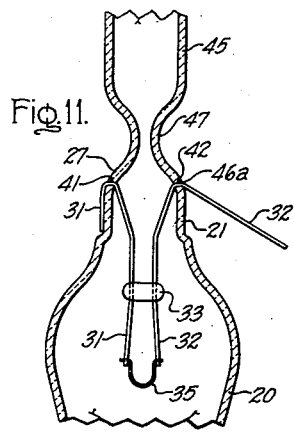
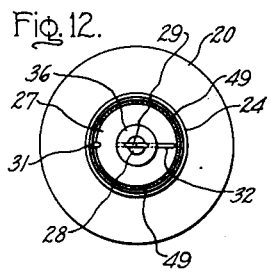
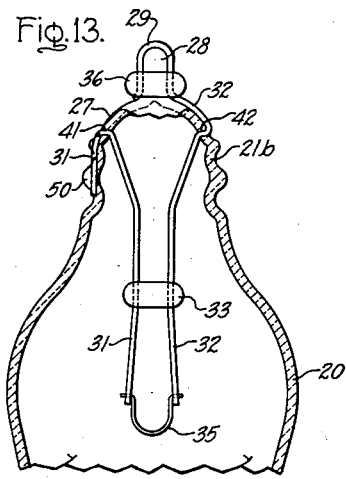
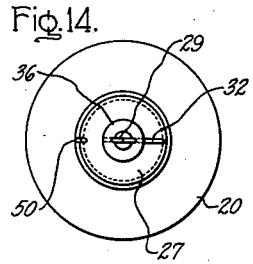
Inventor:
Robert A. Kuebler,
by John H. Anderson
His Attorney.

Patented Oct. 3, 1944

2,359,483

UNITED STATES PATENT OFFICE 2,359,483

VITREOUS ELECTRICAL DEVICE AND ITS FABRICATION

Robert A. Kuebler, Cleveland Heights, Ohio, assignor to General Electric Company, a corporation of New York Application October 17, 1942, Serial No. 462,394

8 Claims. (Cl. 176—32)

This invention relates to vitreous electrical devices and their fabrication. It is especially adaptable for relatively small devices such as electric lamps and discharge tubes, including incandescent lamps of candelabra, miniature, and Christmas tree types, and it is hereinafter explained with particular reference to such lamps. It affords the advantage of simplifying and cheapening the devices and their manufacture, allowing the usual base and basing operations to be done away with—such as cementing, threading lead wires into the base, and soldering the wires to the base contacts. Various other features and advantages of the invention will appear from the description of species and forms of embodiment, and from the drawings.

In the drawings, Fig. 1 shows a vertical axial section through one form of lamp construction embodying the invention, the main parts of a corresponding socket being also shown.

Figs. 2, 3, 4, 5, 6, 7, 8, and 9 are similar views illustrating stages in the fabrication of the lamp shown in Fig. 1 according to one preferred method; and Figs. 10, 11, and 12 are similar views illustrating a procedure alternative to the steps represented in Figs. 4–7.

Figs. 13 and 14 are views generally similar to Figs. 1 and 12 illustrating another modified construction, but omitting the socket features shown in Fig. 1.

Broadly speaking, the lamp here illustrated is of the butt-seal type disclosed in U. S. Patent 1,742,153 to Stiles, Wagener, and Donovan, and may be fabricated in a similar way. As shown in Fig. 1, the lamp L comprises a vitreous envelope or bulb 20 of ordinary type having its neck 21 reduced at a shoulder 22 to a substantially uniform cylindrical form adapted to fit rather loosely in a sheet metal contact shell or band 24, seated against the shoulder 22. For a lamp L to be used in a screw type of socket S, the shell or band 24 is screw threaded to screw into the socket screw shell s. The bulb neck 21 is closed and the envelope is completed by a cup-shaped or dome-like vitreous end 27 which carries an approximately central tip 28, on which is exposed an end or center contact 29 to coact with the socket contact c. The mount 30 within the bulb 20 may be of the usual simple construction used in small lamps of the type illustrated, consisting of a pair of wire leads 31, 32 fused through a vitreous bead 33, and a bowed filament 35 connected between the inner ends of the leads. From the mount 30, the current leads 31, 32 extend out through the vitreous wall at the junction of the bulb neck 21 and its closure 27.

The lead 31 is shown as connected to the shell 24, being bent back or retroverted to extend along the neck 21, in the direction of its axis, between the outside of the neck and the inside of the shell. The other lead 32 connects to the end contact 29 on the tip 28, being bent up and around the side of the rounded end closure 27. In the present instance, the end of the lead wire 32 itself forms the center contact 29, and is doubled up over and around the end of the tip 28 for this purpose. As here shown, the doubled end 29 is held securely in position on the tip (and across its end) by retaining means 36, which may be constructed as described hereinafter.

The bulb 20 and the other vitreous parts mentioned may be made of the glass ordinarily used for miniature and Christmas tree lamps, or of any other suitable vitreous material.

In manufacture, the portion of the lamp mount 30 that is to be within the bulb 20 may be made in the usual form, with the upper ends of its lead wires 31, 32 sloping apart as shown in Fig. 2. At points 41, 42 corresponding to the diametrally opposite edges of the bulb neck 21, Figs. 2 and 3, the leads 31, 32 are bent somewhat differently from what is usual: the lead 31 is retroverted to extend downward along the outside of the neck 21, parallel with its axis, while the lead 32 is offset and bent to extend upward, also parallel with said axis. The mount 30 having been inserted in the bulb 20 as shown in Fig. 3, the next step may be to apply the sheet metal shell or band 24 to fit around the neck and the end of the lead wire 31, as shown in Fig. 4—though if preferred this may be done later. The upward extending end of the lead 32 is preferably bent down to extend outward somewhat as in Fig. 5, and a piece of glass tube 45 is brought down endwise to the open end of the neck 21, as shown in Fig. 5, and is fused thereto at 46 and drawn out to a rather small exhaust neck 47 fairly close above the fused joint, as shown in Fig. 6 and as disclosed in the aforesaid Stiles et al. Patent No. 1,742,153, forming a dome-like end closure 27. In making the fused joint 46, sufficient endwise pressure may be applied to the tube 45 toward the bulb 20 to swell out the vitreous material of the joint 46 to an enlarged size engaging the upper edge of the band 24, as shown in Fig. 6, so that the material forms a retaining means on the neck 21 for resisting displacement of the band therefrom. Or the vitreous material may be slightly expanded at 46 by internal air pressure, applied by blowing through the tube 45. In either case, the incidental expansion of the hot, soft glass neck 21 inside the band 24 will seal or bond the glass to the metal of the band, so as to retain the ring and prevent it from turning on the neck 21 when screwed into a socket or removed therefrom. If desired, such expansion of the glass neck 21 into sealing contact with the ring 24 may even be effected without enlarging the joint at 46 to overlap the upper edge of the ring.

Through the tube 45, the bulb 20 is exhausted and charged with any desired working substance(s) or filling, after which the tube is heated and softened, fused, and sealed off just above the joint 46 and at the neck 47, thus completing the rounded end closure 27 with the central outward projecting exhaust or seal tip 28, as shown in Fig. 7. The lead 32 is bent up against the side of the rounded end 27 and doubled over the tip 28 at 29, as shown in Fig. 8. Finally, the securing means 36 is placed or formed around the tip 28 and the doubled lead end 29, as shown in Fig. 9, to hold the latter in place with its bend exposed across the end of the tip as an end contact. The securing means 36 may consist of a ring embracing the tip 28, and may be formed of fused vitreous material whipped and sealed around the tip while soft; or the vitreous ring 36 may be preformed as such and then slipped over the tip 28 and the lead end 29 and fused or sealed on.

Figs. 10, 11, and 12 illustrate a variation of the procedure above described in connection with Figs. 4, 5, 6, and 7. Instead of applying the shell or band 24 to the bulb neck 21 after insertion of the mount 30 as shown in Fig. 3, the tube 45 is straightway fused on and drawn down to the exhaust neck 27 as shown in Figs. 10 and 11, all without exerting any endwise pressure on the tube 45 to enlarge the joint 46a as compared with the rest of the neck 21. The bulb 20 is then exhausted and charged with any working substance or filling, and the tube 45 is heated and formed into the end closure 27 with its tip 28. Then the lead 32 is bent up against the end 27, etc., the shell or band 24 is fitted tight around the neck 21 and the lead 31, and the retaining means 36 is applied to the tip, etc., all as shown in Fig. 9. When putting on the shell or band 24, a small amount of basing cement 49 may be applied to the neck 21 or to the inside of the band 24 around the two-thirds of their circumference remote from the lead 31 as indicated in Fig. 12, in order to fix the band on the neck more securely.

Figs. 13 and 14 illustrate a modification in which the bulb neck 21b is itself screw threaded conformably to the socket shell s, and has a vertical external groove 50 across the threads to accommodate the retroverted lead 31, of such depth that at the bottoms of the threads about half the thickness of this lead is sheltered and locked in the groove, thus serving as a contact for this side of the lamp circuit when the lamp is screwed into the socket S. The screw threads of the neck 21b and the groove 50 may be molded in the bulb neck when the bulb is made; or they may be formed after the tube 45 is sealed on to the neck, by blowing air in through the tube 45 while the hot, soft glass of the neck is enclosed in a split mold. If preferred, a screw shell or band 24 may be screwed on this threaded bulb neck 21b over the groove-seated end of lead 31 and secured by cement 49b (preferably a conductive cement, so as to assure good connection between lead 31 and band 24) in a manner similar to what has been described in connection with Fig. 12.

In order to dispense with repetitive description, various parts and features in Figs. 10–14 are marked with the reference numerals that are applied to the corresponding parts and features in Figs. 1–9, a distinctive letter being added where such distinction seems necessary.

What I claim as new and desire to secure by Letters Patent of the United States is:

1. A device of the character described comprising a vitreous bulb having a neck portion closed by a residue of exhaust tubing fused thereto and forming an outward projecting tip, a mount in said bulb with current leads extending therefrom out through the joint between said exhaust tubing and said neck, one of said leads extending to the end of said tip and being secured thereto and exposed to serve as an end contact.

2. A device of the character described comprising a vitreous bulb having a neck closed by a residue of exhaust tubing fused thereto and having an outward-projecting tip, a metal base shell around said neck, and a mount in said bulb with current leads extending therefrom out through the joint between said exhaust tubing and said neck, one of said leads connecting to said base shell, and the other lead extending across said tip and being secured thereto and exposed to serve as an end contact.

3. A device of the character described comprising a vitreous bulb having a neck provided with external screw and contact means, said neck being closed and having an outward-projecting tip, a mount in said bulb with current leads extending therefrom out through the vitreous wall at the closure of said neck, one of said leads connecting to the external contact means of said bulb neck, and the other lead being doubled around said tip and exposed across its end as a contact, and securing means for the doubled lead, around the same and said tip.

4. A device of the character described comprising a vitreous bulb having a neck provided with external screw and contact means, a vitreous end sealed to the bulb neck and having an outward-projecting tip, a mount in said bulb with current leads extending therefrom out through the seal between said bulb neck and said end, one of said leads connecting to the external contact means of said bulb neck, and the other lead being doubled around said tip and exposed across its end as a contact, and securing means for the doubled lead, around the same and said tip.

5. A method of fabricating a vitreous-walled device of the character described which comprises inserting a mount with current leads into the open neck of a vitreous bulb, placing one of said leads to extend retroverted along the outside of said neck in the direction of its axis, fusing a vitreous exhaust tube to the neck walls with said current leads extending out through the resulting seal, evacuating the bulb through said tube and then sealing said tube to form a closure across said neck and an outward projecting tip, fitting a base shell around said bulb neck and the aforesaid retroverted lead, and bending the aforesaid other lead to extend to the end of said tip and securing it in this position.

6. A method of fabricating a vitreous-walled device of the character described which comprises inserting a mount with current leads into the open neck of a vitreous bulb, and placing one of said leads to extend retroverted along the outside of said neck in the direction of its axis, and the other lead to extend outward across the end of the bulb neck; fitting a resilient base shell tight around said bulb neck and the aforesaid retroverted lead, thus securing the lead and shell to said neck and in contact with one another; fusing a vitreous piece of the neck walls with said current leads extending out through the resulting seal, and forming from said piece a closure across said neck and an outward-projecting tip; and bending the aforesaid other lead to extend across the end of said tip, and fusing vitreous retaining means to said tip, to hold said lead in position across its end as above set forth.

7. A method of fabricating a vitreous-walled device of the character described which comprises inserting a mount with current leads into the open neck of a vitreous bulb, and placing one of said leads to extend retroverted along the outside of said neck in the direction of its axis, and the other lead to extend outward across the end of the bulb neck; fitting a resilient base shell tight around said bulb neck and the aforesaid retroverted lead, thus securing the lead and shell to said neck and in contact with one another; fusing a vitreous piece to the neck walls with said current leads extending out through the resulting seal, and forming from the vitreous material external retaining means on said neck for retaining said base shell thereon, and also a closure across said neck and an outward-projecting tip; bending and doubling the aforesaid other lead to extend across the end of said tip; and fusing a vitreous retainer around said tip and the doubled wire aforesaid.

8. The method of making electric lamps or similar devices which comprises inserting a mount with current leads into the open neck of a vitreous bulb, placing one of the leads to extend along the outside of said neck, fusing a vitreous exhaust tube to the neck walls with said current leads extending out through the resultant seal, evacuating the bulb through said tube and then sealing the tube to form a closure across said neck and an outward projecting tip, and bending the other lead to extend to the end of said tip and securing it in this position.

ROBERT A. KUEBLER.